Oct. 13, 1931.    T. W. JAMES    1,827,583
METHOD OF SPRAYING LIQUIDS
Filed March 11, 1931

INVENTOR.
Thomas W. James.
BY
Fay, Oberlin & Fay
ATTORNEYS.

Patented Oct. 13, 1931

1,827,583

UNITED STATES PATENT OFFICE

THOMAS W. JAMES, OF CLEVELAND, OHIO, ASSIGNOR TO LUBRI-GRAPH CORPORATION, OF CLEVELAND, OHIO, A CORPORATION OF OHIO

METHOD OF SPRAYING LIQUIDS

Application filed March 11, 1931. Serial No. 521,667.

This invention, relating, as indicated to a method of spraying liquids has specific reference to particular steps which may be carried forth so that the spraying operation of liquid may proceed without the occurrence of fog incidental to the projection of the stream of finely divided particles.

As is well known to those familiar with the art, considerable difficulty is experienced in delivering atomized liquid or liquid mixed with air from a nozzle provided for that purpose onto a receiving surface or the like due to the fact that as such spray leaves the nozzle a considerable portion of the liquid will be so finely divided and so finely suspended in the air that the same floats in the vicinity of delivered stream in the form of a fog and is accordingly wasted. The creation of the fog by the atomized liquid leaving the spray nozzle is also objectionable due to the fact that when the spraying operation continues for an appreciable length of time or is carried on in a closed space, the fog so formed is exceedingly bothersome in a number of ways to the user of the spraying appliance. It is among the objects of my invention to provide an apparatus which by its employment in connection with a spraying nozzle or the like will eliminate all of the above named undesirable characteristics. Other objects of my invention will appear as the description proceeds.

To the accomplishment of the foregoing and related ends, said invention, then, consists of the method hereinafter fully described and particularly pointed out in the claims.

The annexed drawings and the following description setting forth in detail certain steps embodying the invention, such disclosed steps constituting, however, but one of various modes in which the principle of the invention may be practical.

Figure 1:
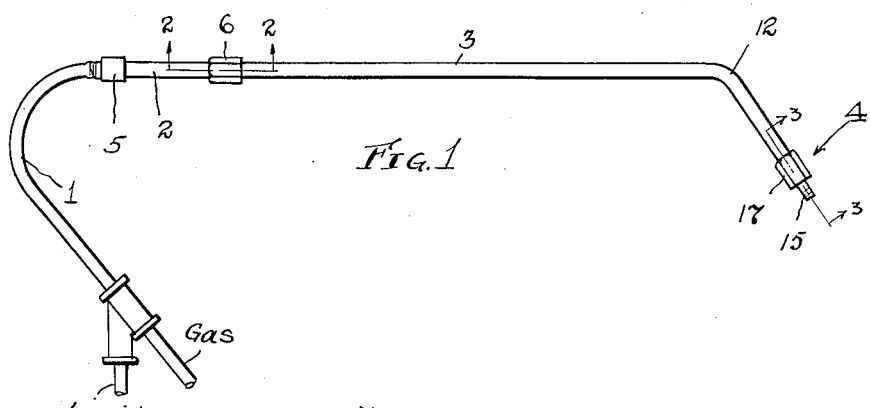
Fig. 1 is an elevational view of the apparatus comprising my invention.

Referring now more specifically to the drawings and more especially to Fig. 1, the apparatus herein illustrated which may be employed in carrying forth the method comprising my invention is designed to be connected to the discharge terminal of a conduit 1, which leads from a suitable spraying apparatus which delivers atomized or suspended liquid or like material through such conduit. The apparatus of my invention consists of a nipple member 2 and a conveying and laterally confining conduit 3 and a discharge nozzle means generally indicated at 4.

The nipple 2 may be secured to the delivery conduit 2 by means of a collar 5 or any well known means.

Interposed intermediately of the nipple 2 and the tubular member 3 is a spray discharging nozzle 6 which is provided with interiorly and exteriorly threaded tubular portions 7 and 8 which respectively form large and small bores 9 and 10 in which and to which the nipple 2 and the tubular member 3 are respectively threadably secured. The portion 8 of the spray discharge nozzle has the end 11 thereof substantially closed with the exception of a relatively small axially extending orifice 12 formed therein for permitting discharge of the atomized liquid from the nipple 2 into the tubular confining member 3.

Figure 3:
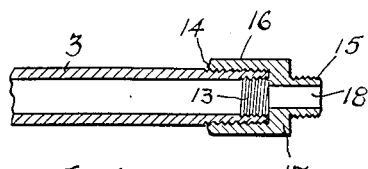
Fig. 3 is a fragmentary sectional view of the apparatus illustrated in Fig. 1 drawn to an enlarged scale on a plane substantially indicated by the line 3—3.

The spray delivering conduit 3 may be bent as at 12 so that when such conduit is grasped in the hand of the operator the discharge terminal thereof will be more conveniently disposed for application of the atomized liquid to the receiving surface. The discharge terminal of the conduit 3, as most clearly illustrated in Fig. 3, is interiorly and exteriorly threaded as at 13 and 14 respectively so as to threadably engage complementary threaded portions 15 and 16 of a discharge nozzle 17. Discharge nozzle 17 is provided with an axially extending bore 18 through the reduced portion 15 for the purpose hereinafter more fully explained.

Figure 2:
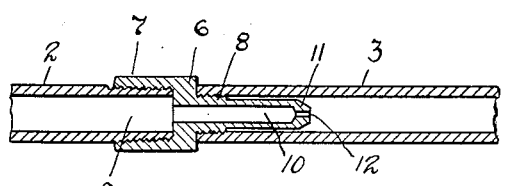
Fig. 2 is a fragmentary sectional view drawn to an enlarged scale of a portion of the apparatus illustrated in Fig. 1 taken on a plane substantially indicated by the line 2—2.

The operation of the described apparatus and the steps may briefly be explained as follows, With the parts assembled as illustrated in Figs. 1, 2 and 3, atomized liquid under pressure will be admitted through conduit 1 so that the same is projected from the orifice 12 of the spray delivering nozzle. The spray is being delivered from the orifice 12 will contain a quantity of finely divided liquid which will be emitted from such orifice in the form of a fog. It will be noted, however, that before the spray is projected into the outside air, such spray is led through the lateral confining tubular member 3 which so mixes the spray that the finely divided particles forming the fog will be absorbed by the large particles so that when the spray finally is ejected from the delivery end of the conduit 3, such fog will be entirely eliminated.

The provision of the nozzle means 17 associated with the discharge terminal of the conduit 3, when arranged in the manner most clearly illustrated in Fig. 3, will cause the spray to be projected from the end of such conduit in a well defined stream according to the cross sectional area of the bore 18 so that such spray may be efficiently delivered and projected in a well defined manner on a particular surface requiring the application of such a well defined stream.

Figure 4:
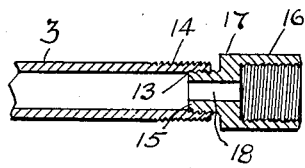
Fig. 4 is a view similar to Fig. 3 showing separable parts thereof reversely disposed.

As clearly illustrated, in Figs. 3 and 4 and as hereinbefore more fully explained, the nozzle member 17 may be reversely secured to the terminal of the conduit 3 as most clearly illustrated in Fig. 4 so that the enlarged bore will be adjacent the discharge terminal and the small end will be threadably engaged by the inner periphery of the threaded terminal 13 of the conduit 3. When the parts are arranged as illustrated in Fig. 4, the spray, in being projected from the delivery terminal of the conduit 3 will be defined by the relatively larger bore on the end of the nozzle so that the stream of spray will be dispersed over a greater area than when the parts are employed in the arrangement illustrated in the previous figure. For determining the concentration of the stream of spray intermediately of the results achieved by employment of the nozzle member 17 in either one of the reverse positions, such nozzle member may be omitted entirely from the end of the delivery conduit 3.

It will be noted that by employing the above described method of spraying the fog usually formed by the passage of the atomized liquid through the constricted spray orifice such as 12 is entirely eliminated when the apparatus is employed under normal conditions and a well defined stream entirely free from such fog may be delivered to the suitable receiving surface. Other advantages resulting from the employment of my method are believed to be so well known to those familiar with the art that a further enumeration of such advantages is unnecessary.

Other modes of applying the principle of my invention may be employed instead of the one explained, change being made as regards the mechanism herein disclosed, provided the steps stated by any of the following claims or the equivalent of such stated steps be employed.

I therefore particularly point out and distinctly claim as my invention:

1. The method of spraying a liquid in finely divided particles which consists of atomizing a mixture of such liquid and a gas, bringing the fog formed by such atomization into contact with the stream of atomized liquid to cause the same to be absorbed thereby, and then discharging such stream.

2. The method of spraying a liquid in finely divided particles which consists of atomizing a mixture of such liquid and a gas, bringing the fog formed by such atomization into contact with the stream of atomized liquid to cause the same to be absorbed thereby, and then changing the velocity of said stream and discharging the same.

3. The method of spraying a liquid in finely divided particles which consists of atomizing a mixture of such liquid and a gas, bringing the fog formed by such atomization into contact with the stream of atomized liquid to cause the same to be absorbed thereby, and then increasing the velocity of said stream and discharging the same.

4. The method of spraying a liquid in finely divided particles which consists of atomizing a mixture of such liquid and a gas, bringing the fog formed by such atomization into contact with the stream of atomized liquid to cause the same to be absorbed thereby, and then decreasing the velocity of said stream and discharging the same.

Signed by me this 9th day of March, 1931.

THOMAS W. JAMES.